(12) United States Patent
Anderson et al.

(10) Patent No.: US 6,388,836 B2
(45) Date of Patent: *May 14, 2002

(54) MAGNETIC SHIELD FOR A TAPE DRIVE READ/WRITE HEAD

(75) Inventors: James C. Anderson, Eagle; Paul W. Poorman, Meridian, both of ID (US)

(73) Assignee: Hewlett-Packard Company, Palo Alto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/191,315

(22) Filed: Nov. 13, 1998

(51) Int. Cl.$^7$ .............................. G11B 5/10; G11B 5/48; G11B 21/16
(52) U.S. Cl. .................. 360/128; 360/241.1; 360/261.3
(58) Field of Search .............................. 360/128, 106, 360/109, 104, 105, 261.3, 241.1

(56) References Cited

U.S. PATENT DOCUMENTS

| | | | | |
|---|---|---|---|---|
| 4,212,043 A | * | 7/1980 | Baker .......................... | 360/104 |
| 4,314,295 A | | 2/1982 | Frandsen ..................... | 360/106 |
| 4,525,696 A | | 6/1985 | Vogelesang ................. | 335/272 |
| 4,609,958 A | | 9/1986 | Irvin .......................... | 360/106 |
| 4,658,313 A | | 4/1987 | Takahashi et al. ............ | 360/98 |
| 4,694,367 A | | 9/1987 | Brent ......................... | 360/106 |
| 4,754,352 A | | 6/1988 | Iwata ......................... | 360/100 |
| 4,785,363 A | * | 11/1988 | Jacobs et al. ................. | 360/93 |
| 4,870,703 A | | 9/1989 | Augeri ..................... | 360/98.07 |
| 4,991,211 A | * | 2/1991 | Cap et al. ..................... | 360/84 |
| 5,041,935 A | | 8/1991 | Aruga ........................ | 360/106 |
| 5,105,322 A | | 4/1992 | Steltzer ..................... | 360/106 |
| 5,130,972 A | | 7/1992 | Mizuno ...................... | 369/215 |
| 5,187,702 A | | 2/1993 | Takahashi ................... | 369/215 |
| 5,227,937 A | * | 7/1993 | Magnusson et al. ........ | 360/104 |
| 5,243,591 A | | 9/1993 | Mogamiya ................... | 369/244 |
| 5,278,820 A | | 1/1994 | Shtipelman ................. | 369/219 |
| 5,280,402 A | * | 1/1994 | Anderson et al. ........... | 360/106 |
| 5,365,390 A | * | 11/1994 | Hasegawa ................... | 360/107 |
| 5,371,636 A | * | 12/1994 | Nayak et al. ................. | 360/75 |
| 5,379,170 A | | 1/1995 | Schwarz .................... | 360/109 |
| 5,414,578 A | * | 5/1995 | Lian et al. .................. | 360/106 |
| 5,424,891 A | * | 6/1995 | Oda et al. .................... | 360/128 |
| 5,434,732 A | | 7/1995 | Schwarz .................... | 360/109 |
| 5,481,424 A | | 1/1996 | Koseki ....................... | 360/106 |
| 5,488,594 A | | 1/1996 | Kobayashi ............... | 369/44.14 |

(List continued on next page.)

FOREIGN PATENT DOCUMENTS

| | | |
|---|---|---|
| EP | 388087 | 9/1990 |
| EP | 0595785 | 5/1994 |
| JP | 59168924 | 9/1984 |
| JP | 04060915 | 2/1992 |
| JP | 4-143932 A | 5/1992 |
| JP | 4178149 | 6/1992 |
| WO | WO 96/13833 | 10/1994 |
| WO | WO95/16986 | 6/1995 |

OTHER PUBLICATIONS

EP Search Report, Feb. 11, 2000.

*Primary Examiner*—William Klimowicz

(57) ABSTRACT

A tape drive read/write head assembly that utilizes a magnetic shield to help protect the head from any magnetic flux that strays from the tape drive's motor. The head assembly includes a voice coil motor, a transducer head (typically a read/write head), and a carriage carrying the head. The carriage is movably coupled to the motor. The magnetic shield is positioned at least partially between the head and the motor. In one preferred version of the invention, the shield is a metal plate sandwiched between the head and the carriage. It is desirable to make the shield from a high nickel content metal or similar type material that has a large magnetic flux carrying capacity with a small magnetizing force.

4 Claims, 9 Drawing Sheets

U.S. PATENT DOCUMENTS

| | | | |
|---|---|---|---|
| 5,504,636 A | | 4/1996 | Yuki ........................ 360/97.01 |
| 5,508,865 A | * | 4/1996 | Garcia et al. ................ 360/109 |
| 5,517,483 A | | 5/1996 | Choi ........................... 369/225 |
| 5,519,554 A | | 5/1996 | Todd ........................... 360/106 |
| 5,581,533 A | | 12/1996 | Fujisawa ..................... 369/112 |
| 5,698,911 A | | 12/1997 | Dunfield ....................... 310/12 |
| 5,711,064 A | * | 1/1998 | Husky et al. ............. 29/603.06 |
| 5,761,182 A | | 6/1998 | Jeon ............................ 369/219 |
| 5,764,618 A | | 6/1998 | Kim ............................ 369/219 |
| 5,901,008 A | * | 5/1999 | Nayak et al. ............. 360/78.02 |
| 5,978,172 A | * | 11/1999 | Nayak et al. ............. 360/78.02 |
| 6,078,483 A | * | 6/2000 | Anderson ................ 360/261.1 |

\* cited by examiner

MAGNETIC SHIELD FOR A TAPE DRIVE READ/WRITE HEAD

FIELD OF THE INVENTION

The present invention relates generally to tape drives and, more particularly, to a tape drive read/write head assembly that includes a shield to help protect the head from any magnetic flux that strays from the tape drive's voice coil motor.

BACKGROUND OF THE INVENTION

Information is recorded on and read from a moving magnetic tape with a magnetic read/write head positioned next to the tape. The magnetic "head" may be a single head or, as is common, a series of read/write head elements stacked individually and/or in pairs within the head unit. Data is recorded in tracks on the tape by moving the tape lengthwise past the head. The head elements are selectively activated by electric currents representing the information to be recorded on the tape. The information is read from the tape by moving the tape longitudinally past the head elements so that magnetic flux patterns on the tape create electric signals in the head elements. These signals represent the information stored on the tape.

Data is recorded on and read from each of the parallel tracks on the tape by positioning the head elements at different locations across the tape. That is, head elements are moved from track to track as necessary to either record or read the desired information. Movement of the magnetic head is controlled by an actuator operatively coupled to some type of servo control circuitry. Tape drive head positioning actuators often include a lead screw driven by a stepper motor, a voice coil motor, or a combination of both. The carriage that supports the head is driven by the actuator along a path perpendicular to the direction that the tape travels. The head elements are positioned as close to the center of a track as possible based upon the servo information recorded on the tape.

For tape drives that utilize a voice coil motor to position the read/write head, stray magnetic flux from the motor can adversely affect performance of the magnetic read/write head. It is desirable, therefore, to shield the read/write head from any magnetic flux that strays from the tape drive's voice coil motor.

SUMMARY OF THE INVENTION

Accordingly, the present invention is directed to a tape drive read/write head assembly that utilizes a magnetic shield to help protect the head from any magnetic flux that strays from the tape drive's motor. The head assembly includes a voice coil motor, a transducer head (typically a read/write head), and a carriage carrying the head. The carriage is movably coupled to the motor. The magnetic shield is positioned at least partially between the head and the motor. In one preferred version of the invention, the shield is a metal plate sandwiched between the head and the carriage. It is desirable to make the shield from a high nickel content metal or similar type material that has a large magnetic flux carrying capacity with a small magnetizing force.

DETAILED DESCRIPTION OF THE INVENTION

Figure 1:
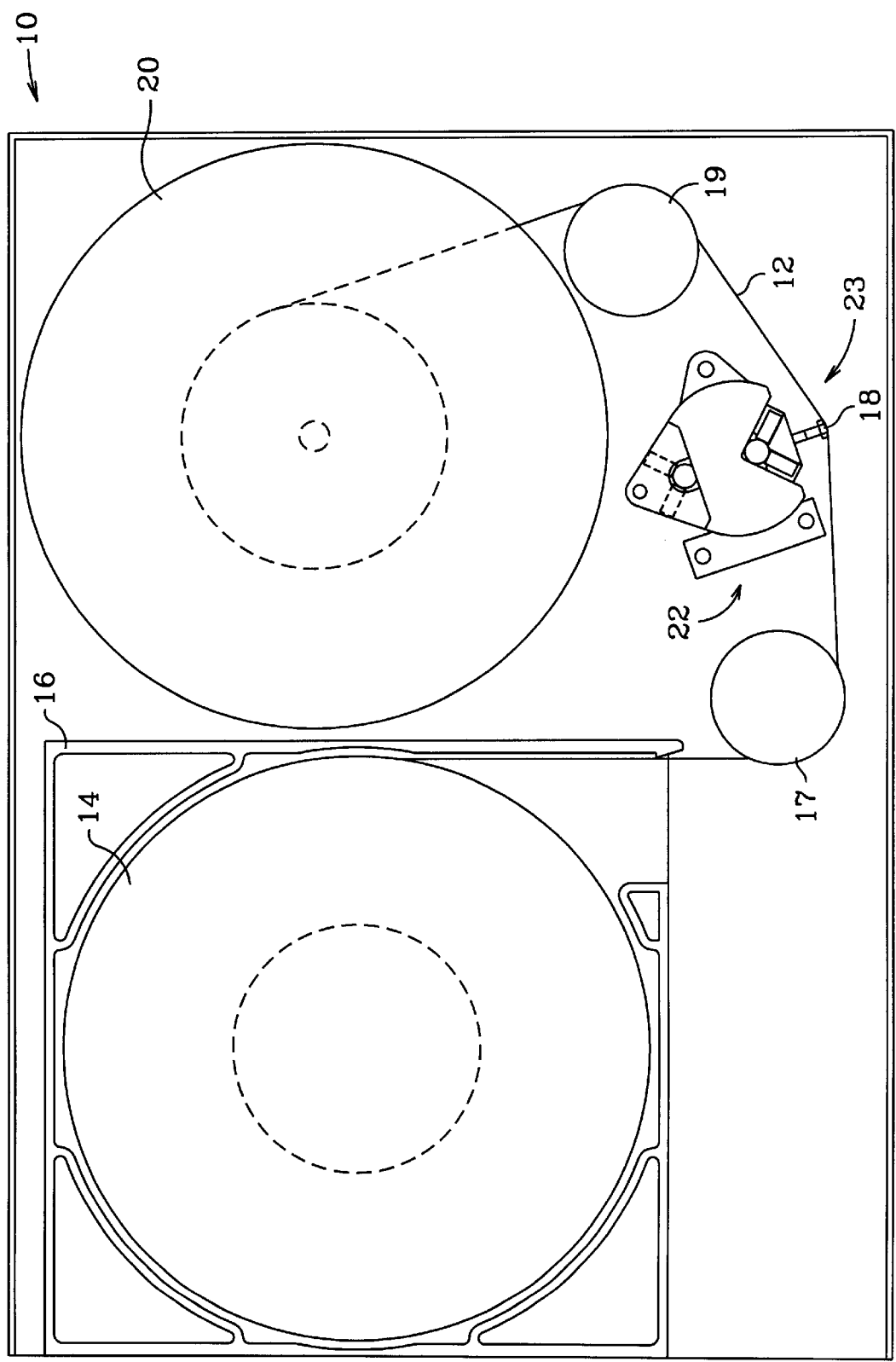
FIG. 1 is a top down plan view of a tape drive illustrating one type of voice coil motor driven read/write head assembly.

Referring first to FIG. 1, a magnetic tape 12 is wound on a single supply spool 14 and tape cartridge 16. Tape cartridge 16 is inserted into tape drive 10 for read and write operations. Tape 12 passes around tape guide 17, over a magnetic read/write head 18, around tape guide 19 to take up spool 20. Head 18 is mounted to an actuator 22 that includes a variety of operational features related to head 18. Read/write head 18 engages tape 12 as tape 12 moves across the face of head 18 to record data on tape 12 and to read data from tape 12.

Figure 2:
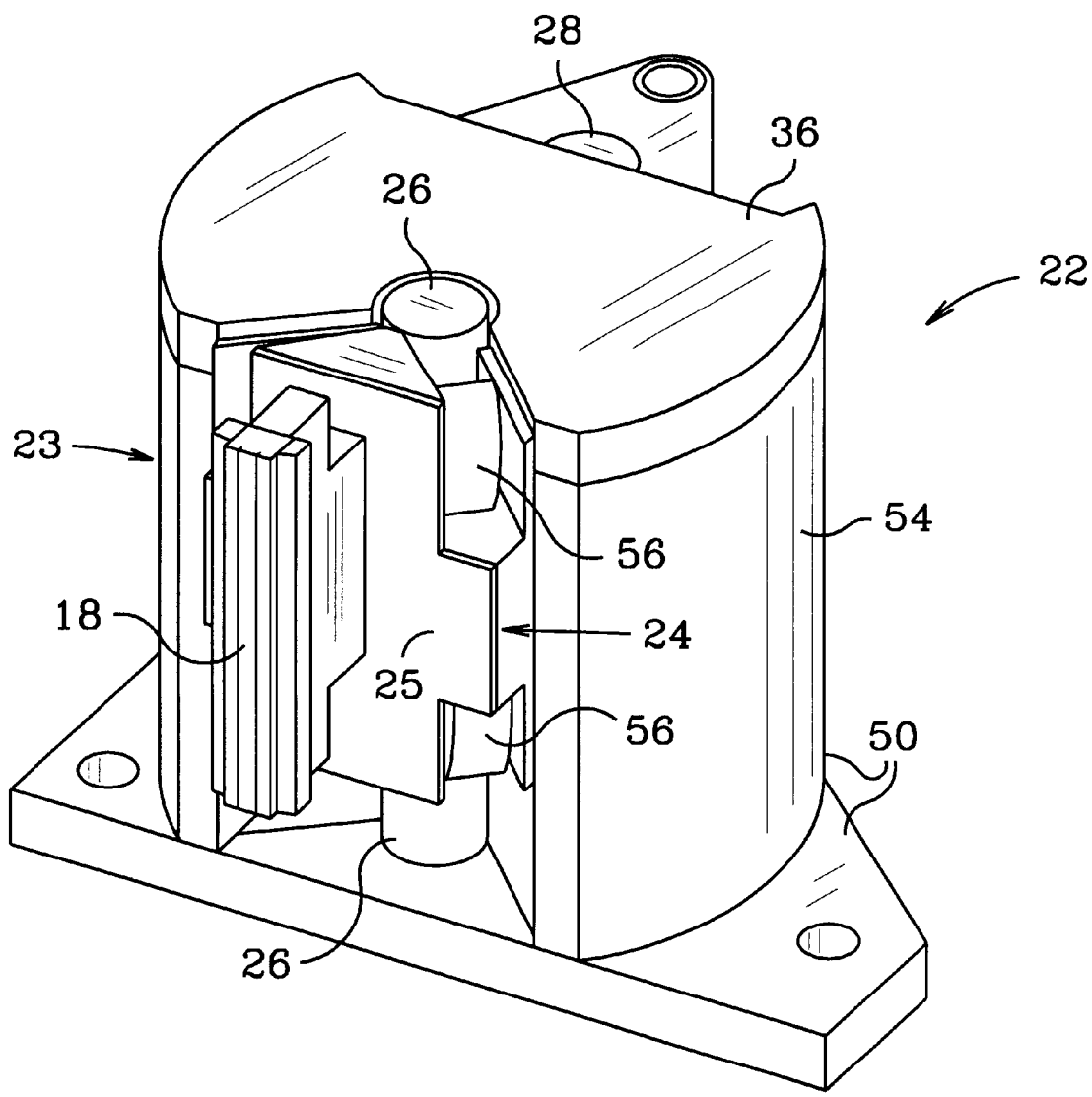
FIG. 2 is a perspective view of a read/write head assembly constructed according one embodiment of the invention in which the magnetic shield is positioned between the read/write head and the head carriage.
Figure 3:
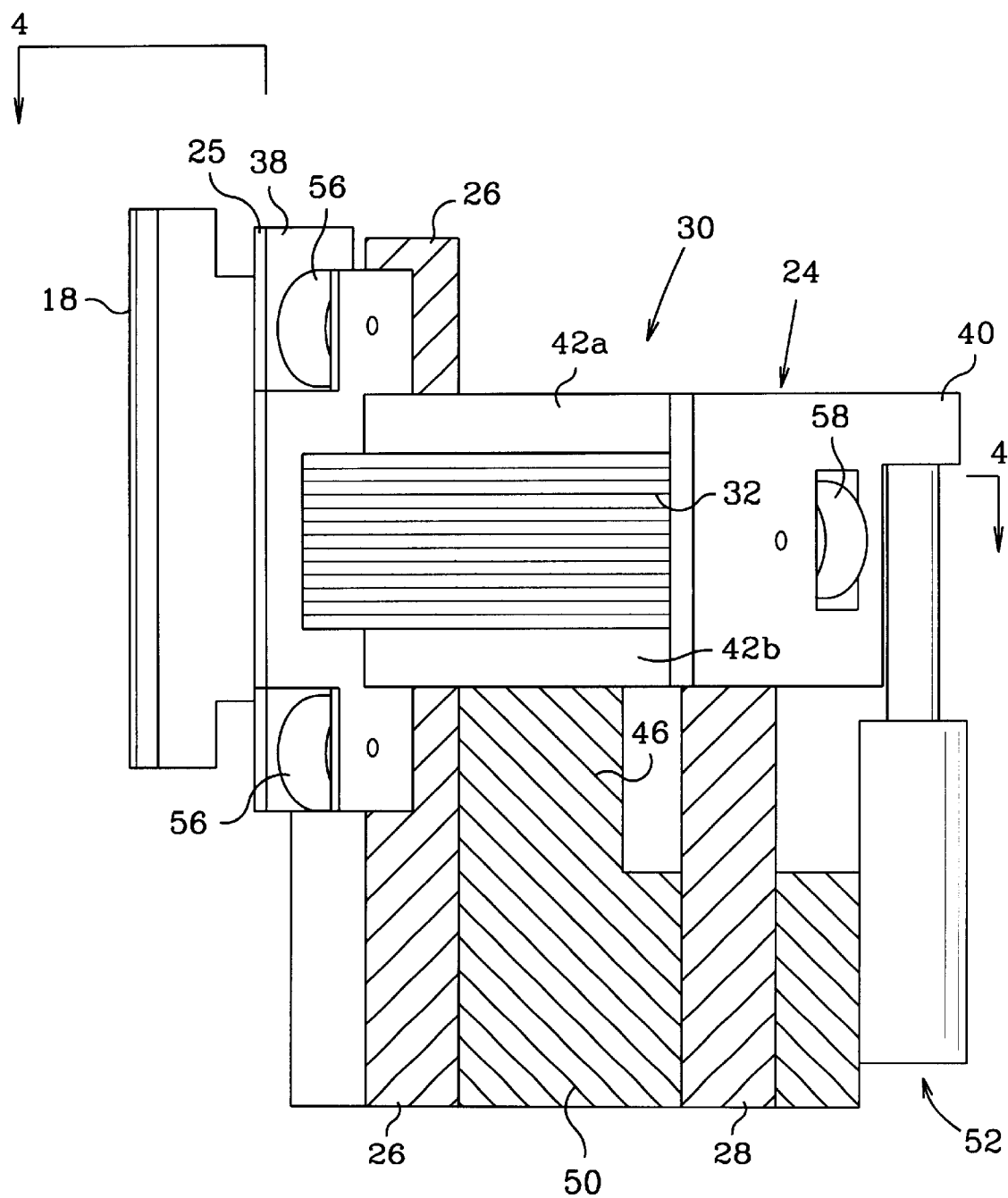
FIG. 3 is a side elevation and partial section view of the read/write head assembly of FIG. 2.
Figure 4:
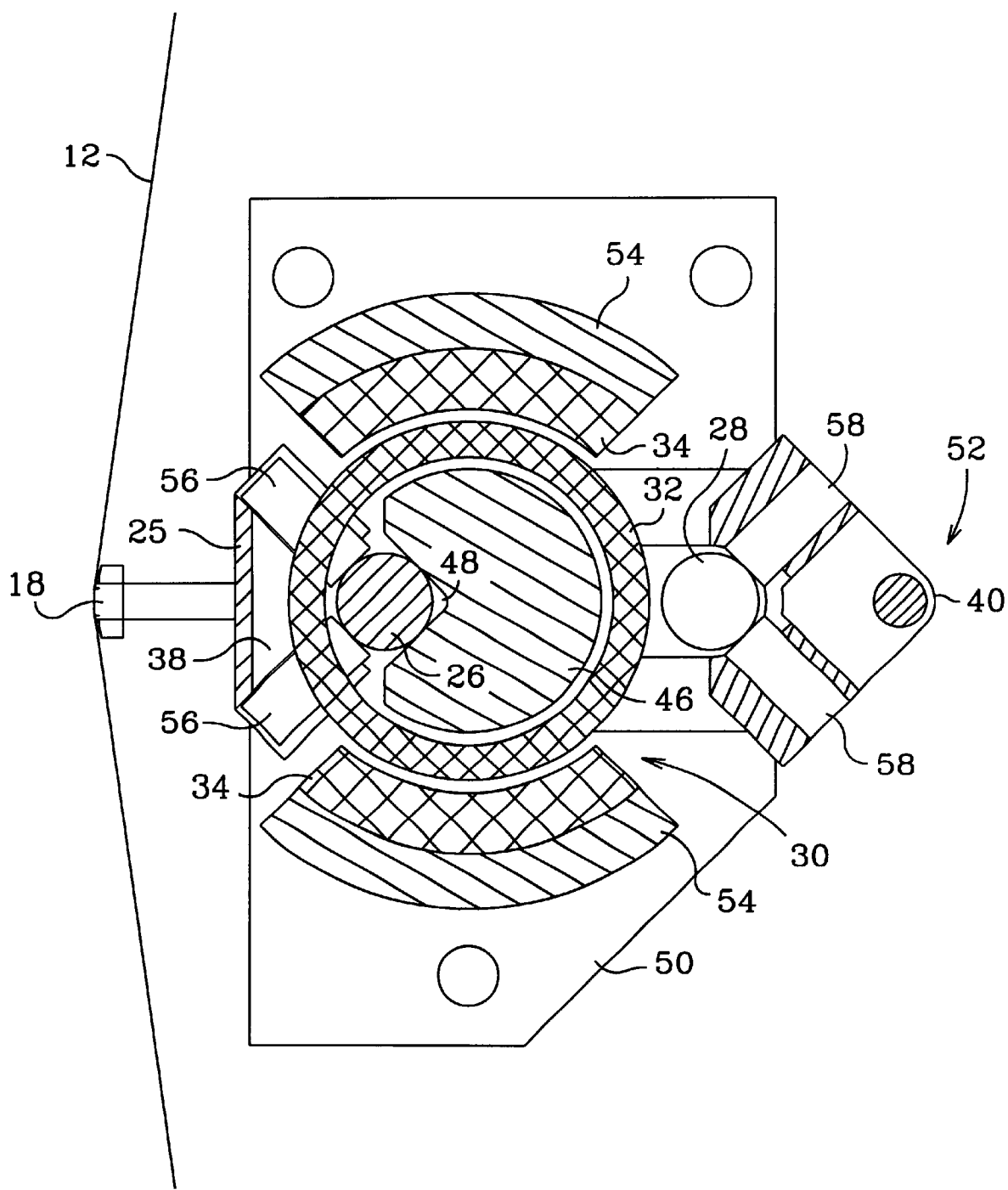
FIG. 4 is a top down plan and partial section view of the read/write head assembly taken along the line 4—4 in FIG. 3.

FIG. 2 is a perspective view of tape drive head assembly 23. Head assembly 23 includes head 18, actuator 22 and magnetic shield 25. FIGS. 3 and 4 are elevation and plan views of head assembly 23. The structure and operation of actuator 22 will now be described generally with reference to FIGS. 2–4. Actuator 22 is described in detail in the copending and commonly owned U.S. patent application Ser. No. 09/102,731 entitled Carriage And Actuator Assembly, which is incorporated herein by reference. Referring to FIGS. 2–4, head 18 is carried by a moveable carriage 24. Carriage 24 moves up and down along guide rails 26 and 28 at the urging of voice coil motor 30. Head 18, which is carried by carriage 24, therefore, also moves up and down in a direction perpendicular to the direction of tape travel as desired to properly position head 18 for reading and writing operations.

Voice coil motor 30 includes a coil 32 and magnets 34. Magnets 34 are attached to the inside of sidewalls 54 of actuator base 50. Top flux plate 36 fits on top of sidewalls 54 of base 50. Actuator base 50 is secured to the frame or another stable component of tape drive 10. Coil 32 is mounted to carriage 24.

Figure 5:
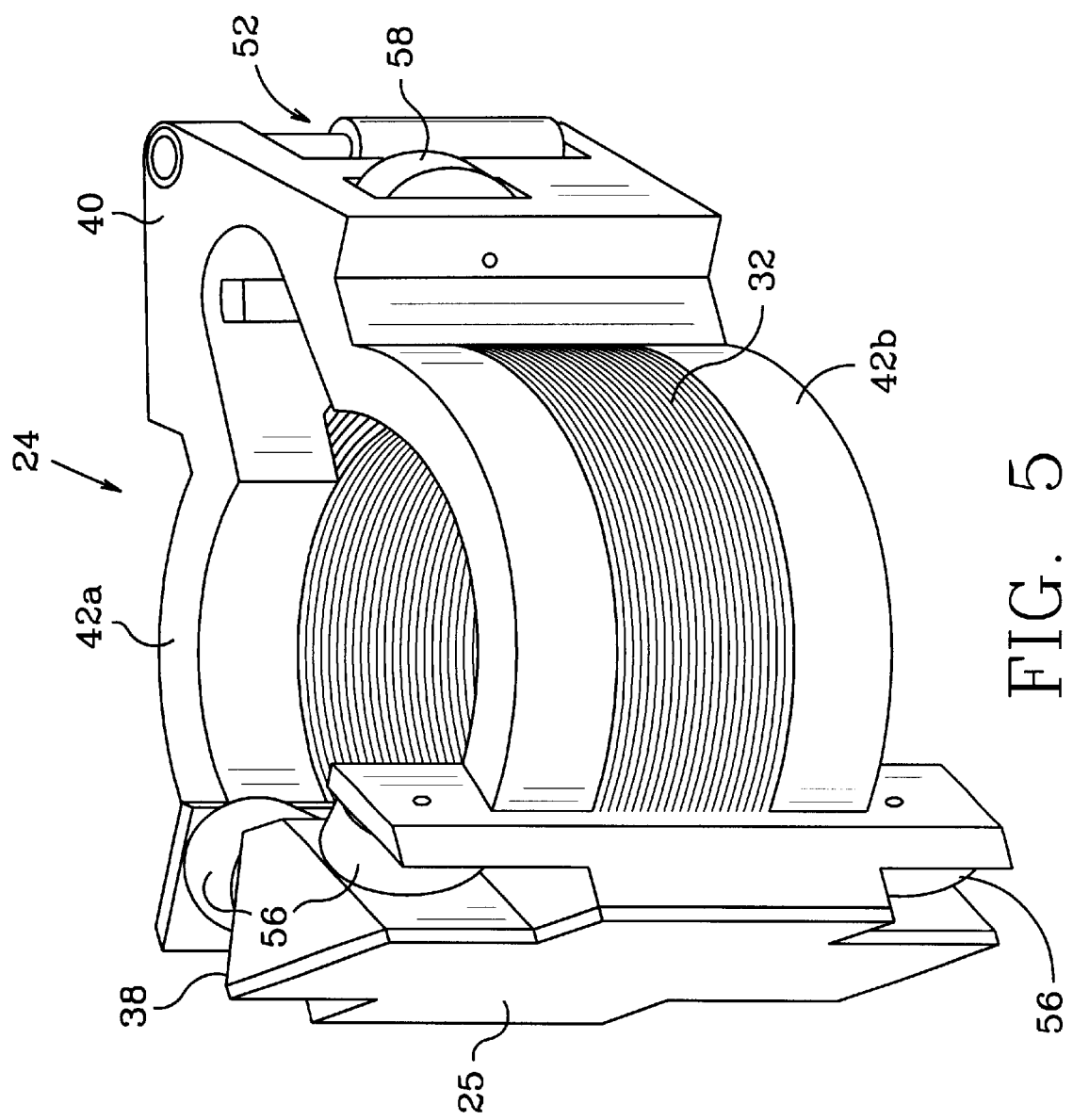
FIG. 5 is a detail perspective view of the head carriage portion of the read/write head assembly of FIGS. 2–4.

The details of carriage 24 are best seen in FIG. 5 which is a perspective view of carriage 24 with coil 32 installed. Referring to FIG. 5, carriage 24 includes a front portion 38, a back portion 40 and truncated ring shaped center portions 42A and 42B that join the front and back portions 38, 40. Center portions 42A and 42B are positioned inside a circumferential perimeter defined by magnets 34. The ring shaped center portions 42A and 42B are spaced apart a distance equal to or slightly greater than the height (the axial dimension) of coil 32. Coil 32 is sandwiched between and firmly attached to ring shaped center portions 42B and 42C in carriage 24. Coil 32 is exposed at cavities 44 formed on each side of carriage 24 between ring shaped center portions 42A and 42B. Carriage 24 travels along guide rails 26 on bearings 56 and 58

Figure 9:
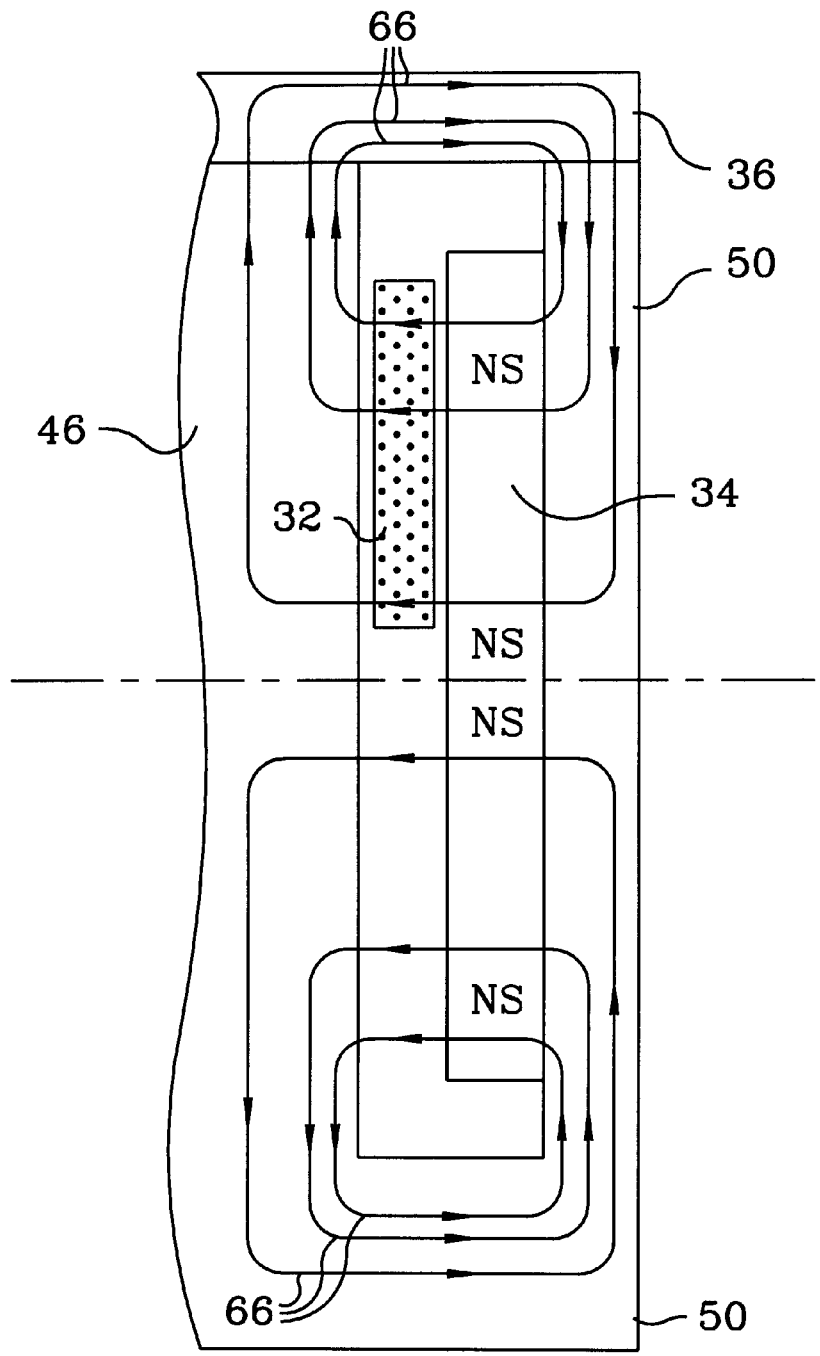
FIG. 9 is a representational side view of the actuator showing the magnetic flux in the voice coil motor.

In operation, actuator 22 positions head 18 relative to tape 12 according to positional information recorded on tape 12. It may be desirable, and in some cases necessary, to make one or all of top flux plate 36, post 46 and actuator base 50 from a soft magnetic steel to carry the magnetic flux 62 generated by magnets 34 through the space occupied by coil 32, as shown in FIG. 9. A servo control signal is generated from the positional information on tape 12 through servo control circuitry (not shown) and delivered as an electrical current to voice coil 32. The presence of current in coil 32 in the magnetic field generated by magnets 34 creates a vertical force on coil 32 and, correspondingly, on carriage 24. This vertical force moves carriage 24 and head 18 up or down as necessary to properly position head 18 relative to tape 12.

Magnetic shield 25 is positioned between motor 30 and head 18. Even relatively low levels of magnetic flux can adversely affect the performance of the magnetic read/write elements in head 18. Shield 25 intercepts stray flux to minimize the magnetic flux present at the location of head 18. Preferably, shield 25 is configured as to size, shape and material to act as a "collector" of stray flux in the vicinity of head 18. High permeability materials and materials that can carry a large magnetic flux with a small magnetizing force are preferred for shield 18. Metals having a high nickel content such as those available commercially under the names Mumetal and CoNetic AA make good magnetic shields. These materials, which are specifically designed for magnetic shielding, can carry a large magnetic flux with a small magnetizing force. In the embodiment shown in FIGS. 2–5, shield 25 is substantially the same size as the front portion 38 of carriage 24 to which head 18 is attached. The size and shape of shield 25 may vary depending on the amount of stray flux near head 18 and the characteristics of the shielding material.

Figure 6:
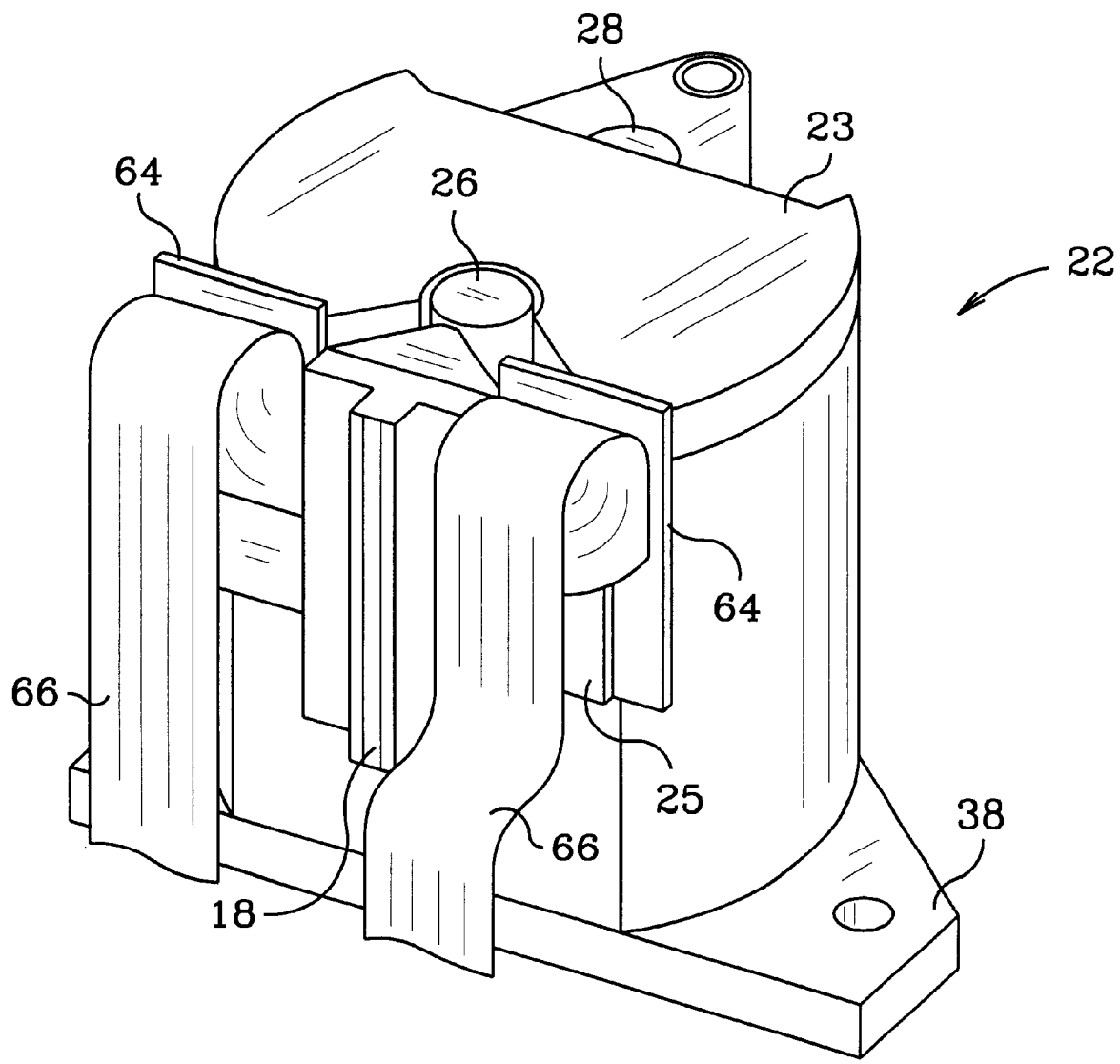
FIG. 6 is a perspective view of a read/write head assembly constructed according to a second embodiment of the invention in which the magnetic shield is positioned on both sides of a flex circuit stiffener interposed between the read/write head and the head carriage.
Figure 7:
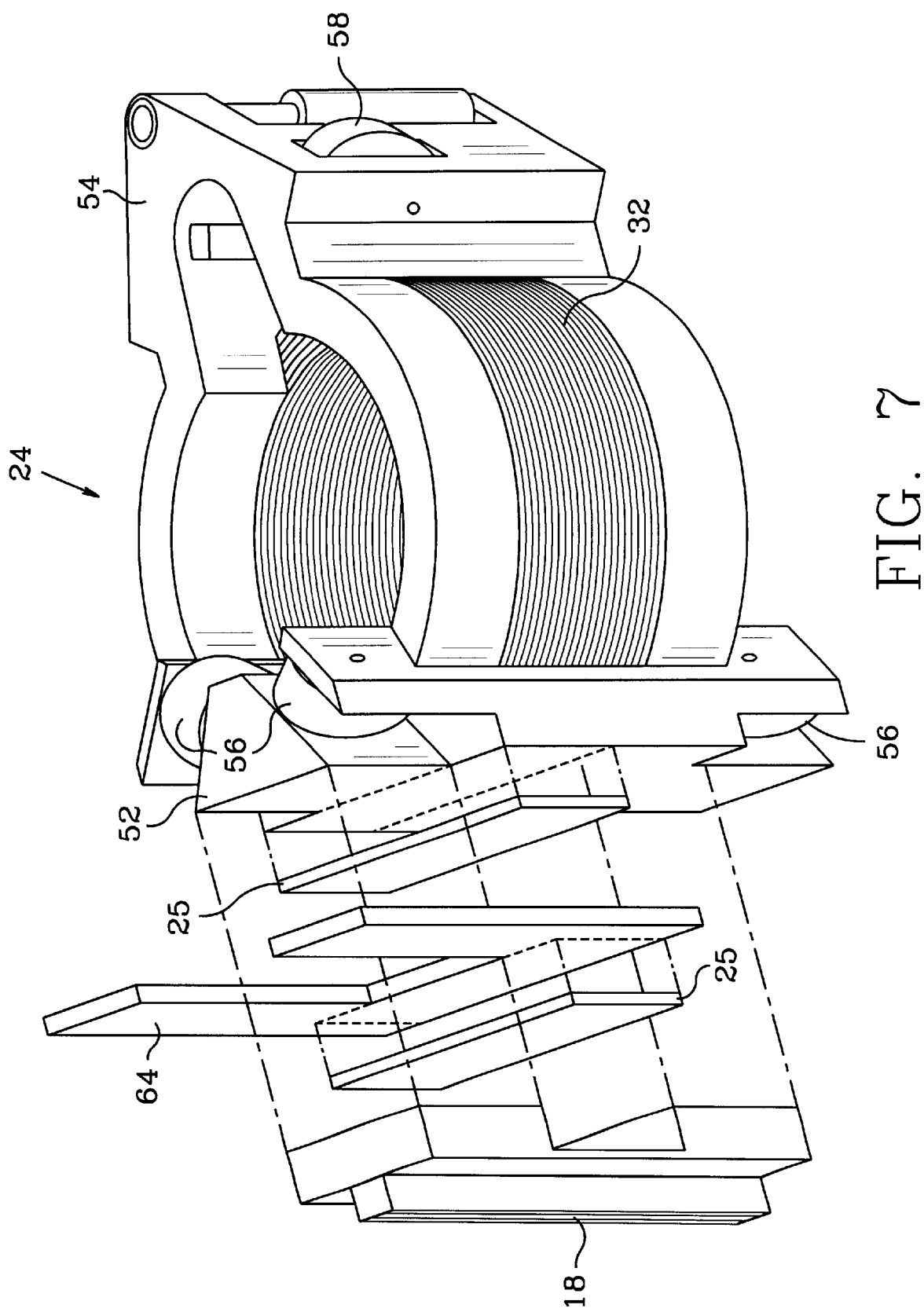
FIG. 7 is a detail perspective view of the head carriage portion of the read/write head assembly of FIG. 6.
Figure 8:
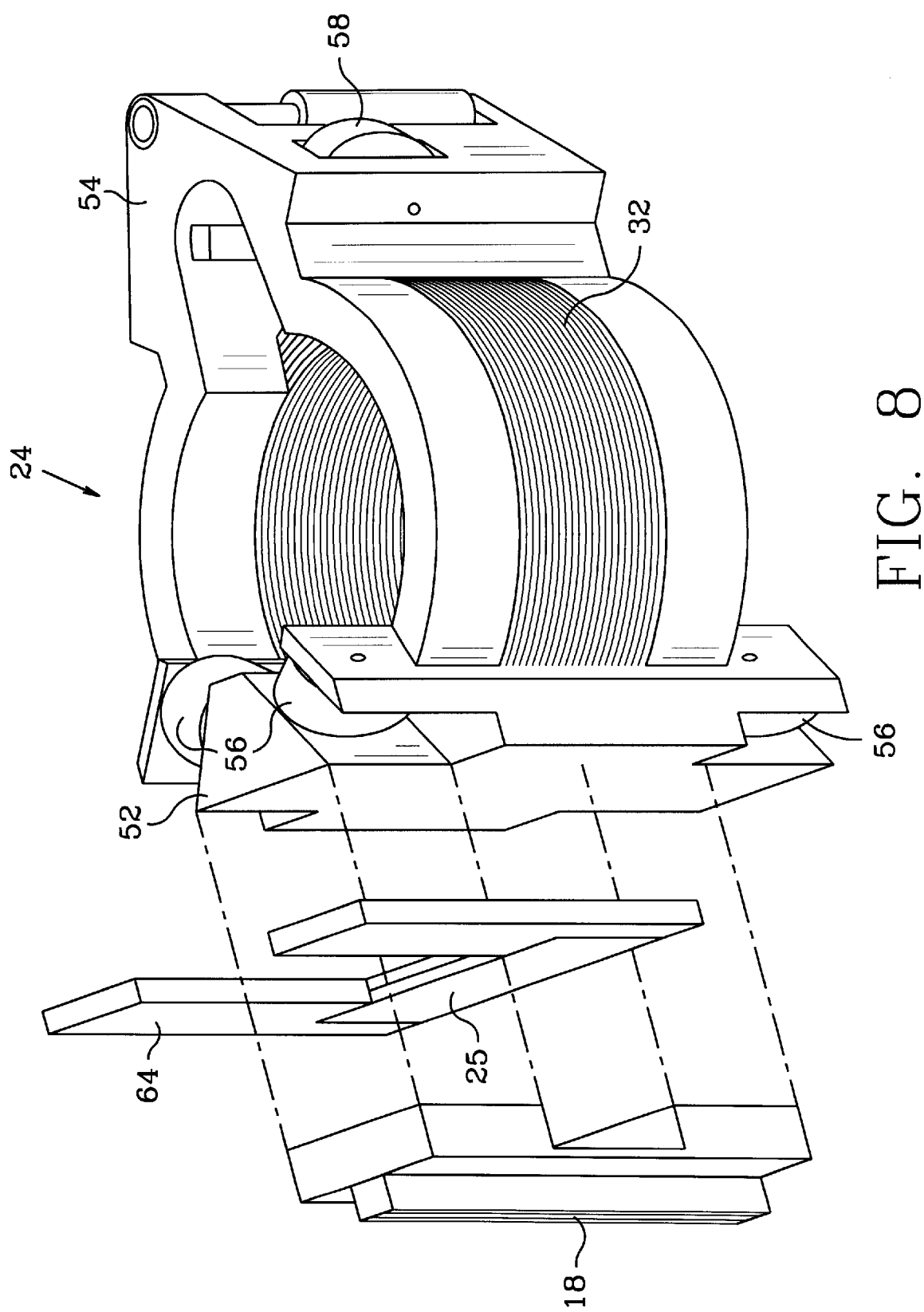
FIG. 8 is a detail perspective view of the head carriage portion of the read/write head assembly showing a magnetic shield embedded in the flex circuit stiffener of FIG. 6.

In a second embodiment shown in FIGS. 6–7, head assembly 23 include a flex circuit stiffener 64. Flexible circuits 66 electrically connect head 18 with a printed circuit control board (not shown). Flexible circuits 66 provide the communication path for data and servo information to head 18. Flexible circuits 66 are glued or otherwise affixed to stiffener 64. Stiffener 64 helps support flexible circuits 66. The structure and function of stiffener 64 is described in detail in the copending and commonly owned U.S. patent application Ser. No. 09/079,109 entitled Flexible Circuit Support Structure And Head Carrier, now U.S. Pat. No. 6,078,483, which is incorporated herein by reference. In this embodiment, shield 25 is glued or otherwise affixed to stiffener 64. Shielding can be increased if necessary or desirable by installing magnetic shields 25 on both sides of stiffener 64, as shown in FIG. 7. Shield 25 may be formed as an integral part molded or otherwise embedded in a plastic stiffener 64, as shown in FIG. 8.

Although the invention has been shown and described with reference to the foregoing embodiments, alternative embodiments may be made without departing from the spirit and scope of the invention as defined in following claims.

What is claimed is:

1. A tape drive head assembly, comprising:
    a motor having an annular coil of electrically conductive windings and a magnet surrounding at least a part of the coil;
    a first guide rail extending axially through the inside of the coil;
    a transducer head;
    a carriage movably coupled to the guide rail for travel thereon at the urging of the motor, the carriage carrying a payload that includes the head, the coil, and a magnetic shield disposed at least partially between the head and the coil and between the head and the magnet.

2. The assembly according to claim 1, further comprising a second guide rail positioned outside the call parallel to the first guide rail, the carriage movably coupled to the first and second guide rails for travel thereon at the urging of the motor.

3. The assembly according to claim 2, further comprising first, second and third d bearings mounted to the carriage, the first and second bearings engaging the first guide rail at locations spaced apart axially from one another and the third bearings engaging the second guide rail at an axial location between the first and second bearings.

4. The assembly according to claim 1, wherein the magnet comprises an arcuate magnet and the carriage includes a first portion mounting the head and a ring shaped second portion mounting the coil, the magnetic shield interposed between the head and the carriage on the first portion of the carriage.

* * * * *